(12) United States Patent
Gross et al.

(10) Patent No.: US 9,447,876 B2
(45) Date of Patent: Sep. 20, 2016

(54) TRANSMISSION ACTUATOR AND METHODS OF USE AND MANUFACTURE THEREOF

(71) Applicant: Honda Motor Co., Ltd., Tokyo (JP)

(72) Inventors: William J. Gross, Marysville, OH (US); Greg B. Resh, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 14/302,404

(22) Filed: Jun. 11, 2014

(65) Prior Publication Data

US 2015/0362069 A1 Dec. 17, 2015

(51) Int. Cl.
*F16H 63/34* (2006.01)
*F16H 59/08* (2006.01)

(52) U.S. Cl.
CPC .......... *F16H 63/3491* (2013.01); *F16H 59/08* (2013.01); *F16H 63/3425* (2013.01); *F16H 63/3433* (2013.01); *Y10T 74/2014* (2015.01)

(58) Field of Classification Search
CPC .......... F16H 63/3491; F16H 63/3425; F16H 63/3433
See application file for complete search history.

(56) References Cited

U.S. PATENT DOCUMENTS

| | | | |
|---|---|---|---|
| 980,632 A | 1/1911 | Hartvigsen | |
| 1,328,688 A | 1/1920 | Pond | |
| 1,648,200 A | 11/1927 | Schulze | |
| 1,652,272 A | 12/1927 | Dawson | |
| 2,379,296 A | 6/1945 | Harbert | |
| 2,558,704 A | 6/1951 | Heimann et al. | |
| 2,873,832 A | 2/1959 | Helm | |
| 3,587,796 A | 6/1971 | Nestvogel | |
| 3,909,878 A | 10/1975 | Natinsky | |
| 3,928,877 A | 12/1975 | Tregoning | |
| 4,282,769 A | 8/1981 | Sandrock | |
| 4,531,422 A | 7/1985 | Yarnell | |
| 4,556,352 A | 12/1985 | Resnicow | |
| 4,779,477 A | 10/1988 | Horton | |
| 4,930,609 A | 6/1990 | Bois et al. | |
| 5,309,744 A * | 5/1994 | Kito | B60R 25/02144 192/219.6 |
| 5,489,246 A * | 2/1996 | Moody | F16H 59/10 192/220.2 |
| 5,528,964 A | 6/1996 | Smith, Jr. | |
| 5,797,300 A | 8/1998 | Fairbanks | |
| 6,089,128 A | 7/2000 | Kopyless | |

(Continued)

FOREIGN PATENT DOCUMENTS

GB 1 477 355 6/1977

*Primary Examiner* — Robert Hodge
*Assistant Examiner* — Stacey Fluhart
(74) *Attorney, Agent, or Firm* — Kenealy Vaidya LLP

(57) ABSTRACT

Some embodiments are directed to a vehicular transmission actuator. A release shaft is operatively coupled to a gear, and is actuable between a first position in which the gear is engaged, and a second position in which the gear is disengaged. The release shaft extends through an opening of a transmission case so as to define an exterior portion that projects beyond the exterior surface of the transmission case. A protuberance is disposed at the exterior surface of the transmission case adjacent the opening. A bracket is operatively connectable to the exterior portion of the release shaft to enable manual actuation of the release shaft from the first position to the second position. The bracket is configured to cooperate with the protuberance to automatically hold the release shaft in the second position subsequent to manual actuation of the release shaft from the first position to the second position.

20 Claims, 12 Drawing Sheets

(56) References Cited

U.S. PATENT DOCUMENTS

| | | |
|---|---|---|
| D433,293 S | 11/2000 | Marcus |
| 6,679,361 B2 | 1/2004 | Ahnert et al. |
| 7,934,896 B2 | 5/2011 | Schnier |
| 8,561,941 B2 | 10/2013 | Combes et al. |
| 2004/0089113 A1 | 5/2004 | Morgan |
| 2013/0151095 A1 | 6/2013 | Fyie et al. |
| 2014/0084601 A1 | 3/2014 | Stendal |
| 2015/0122068 A1* | 5/2015 | Hopkins ............. F16H 63/3491 74/473.24 |

* cited by examiner

TRANSMISSION ACTUATOR AND METHODS OF USE AND MANUFACTURE THEREOF

BACKGROUND

The disclosed subject matter relates to vehicle transmissions that include multiple gears or gear missions, and methods of use and manufacture thereof. More particularly, the disclosed subject matter relates to methods and apparatus that place and hold a vehicle transmission in a certain gear.

Related art vehicles include manual and automatic transmissions that provide various gears or gear selection conditions, such as Drive, Reverse, Park, and Neutral. Many of these related art manual and automatic transmissions include a manually operated gear shifter that enables a vehicle operator to select a certain gear selection condition, such as Neutral where the transmission output shaft can be decoupled from the transmission input shaft so that the vehicle can be moved independently of the operating state of the power source driving the transmission. This gear shifter is typically a mechanical device that is disposed for actuation by an individual operating the vehicle.

SUMMARY

The related art mechanical gear shifters may be manually operated to shift the vehicle transmission into a certain gear regardless of certain other vehicle conditions. For example, an operator can use some of these mechanical gear shifters to change the vehicle transmission gear even if the vehicle is not able to be operated or driven, electrical energy is unavailable (such as due to a dead or inoperable battery), etc. The ability to shift gears independent of other vehicle conditions, such as drivability, electric power supply, etc., can be beneficial under certain circumstances, such as in situations where it is helpful to shift the vehicle transmission into Neutral so that the vehicle can be manually manipulated or moved, serviced, etc.

However, operation of certain other types of transmissions, such as shift-by-wire transmissions, are dependent on the supply of electricity. For example, some of these transmissions activate the desired gear selection condition via electrical or electro-mechanical actuators in response to a signal device such as electronic buttons, that are at least partially dependent on the supply of electricity. This dependency on electricity thereby can impede the activation of the desired gear selection condition, such as Neutral to enable manual movement, service, etc., under certain of the above circumstances, e.g., dead or inoperable battery, etc.

It may therefore be beneficial to provide methods and apparatus for enabling the shifting of gear selection conditions under any one or multiple of the above circumstances. This shifting of gear selection conditions can include or otherwise cover the ability to shift among or to all gear selection conditions; only among or to certain gear selection conditions; and/or among or to only a single gear selection condition, such as Neutral. Some of the disclosed methods and apparatus enable both shifting among or to gears, as well as holding, locking or maintaining the transmission in the selected gear for a certain period.

These methods and apparatus may be especially beneficial for transmissions that are at least partially dependent on the supply of electricity, because they provide the ability to switch gear selection condition under circumstances where such switching could otherwise be difficult or not possible. However, some or all of these methods and apparatus may also be applicable or beneficial to transmissions with gear shifters that operate independently of electric power supply, drivability, etc., because they can provide an alternative to, and in some cases override, the gear shifting mechanism. This alternative or override gear shifting mechanism may be beneficial in situations where the primary gear shifter is stuck, broken, inoperable, or otherwise inconvenient to use.

Some embodiments are therefore directed to a transmission actuator for use with a vehicle transmission that includes at least one gear disposed within a transmission case. The transmission case can include an exterior surface and an opening defined therein. The transmission actuator can include a release shaft operatively coupled to the at least one gear, and actuable between a first position in which the at least one gear is in an engaged state, and a second position in which the at least one gear is in a disengaged state, the release shaft extending through the opening of the transmission case so as to define an exterior portion that projects beyond the exterior surface of the transmission case. A protuberance can be disposed at the exterior surface of the transmission case adjacent the opening. A bracket can be operatively connectable to the exterior portion of the release shaft to enable manual actuation of the release shaft from the first position to the second position. The bracket can be configured to cooperate with the protuberance to automatically hold the release shaft in the second position subsequent to manual actuation of the release shaft from the first position to the second position.

Some other embodiments are directed to a vehicular transmission system including a transmission case having an exterior surface and an opening defined therein. At least one gear can be disposed within the transmission case, the at least one gear corresponding to a Park gear of the transmission. A transmission actuator can include a release shaft operatively coupled to the at least one gear, and actuable between a first position in which the at least one gear is in an engaged state, and a second position in which the at least one gear is in a disengaged state that corresponds to a Neutral state of the transmission, the release shaft extending through the opening of the transmission case so as to define an exterior portion that projects beyond the exterior surface of the transmission case. A protuberance can be disposed at the exterior surface of the transmission case adjacent the opening. A bracket can be operatively connectable to the exterior portion of the release shaft to enable manual actuation of the release shaft from the first position to the second position. The bracket can be configured to cooperate with the protuberance to automatically hold the release shaft in the second position subsequent to manual actuation of the release shaft from the first position to the second position.

Still other embodiments are directed to a method of disengaging at least one gear of a vehicular transmission. The at least one gear can be disposed within a transmission case, and the transmission case can include an exterior surface and an opening defined therein. The method can include manually positioning a bracket over a protuberance defined at an exterior surface of the transmission case, such that a keyed portion of a release shaft, which projects beyond the exterior surface of the transmission case, extends within a slot defined in a top surface of the bracket. The method can also include rotating the bracket with the keyed portion disposed within the slot so as to correspondingly rotate the release shaft, the release being shaft operatively coupled to the at least one gear, such that rotation of the bracket actuates the release shaft from a first position in which the at least one gear is in an engaged state, and a second position in which the at least one gear is in a disengaged state. The method can further include lowering the bracket over the protuberance such that the protuberance is disposed within an interior space of the bracket, the bracket and protuberance being configured to cooperate to automatically hold the release shaft in the second position subsequent to actuation of the release shaft from the first position to the second position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Transmission System

Figure 1:
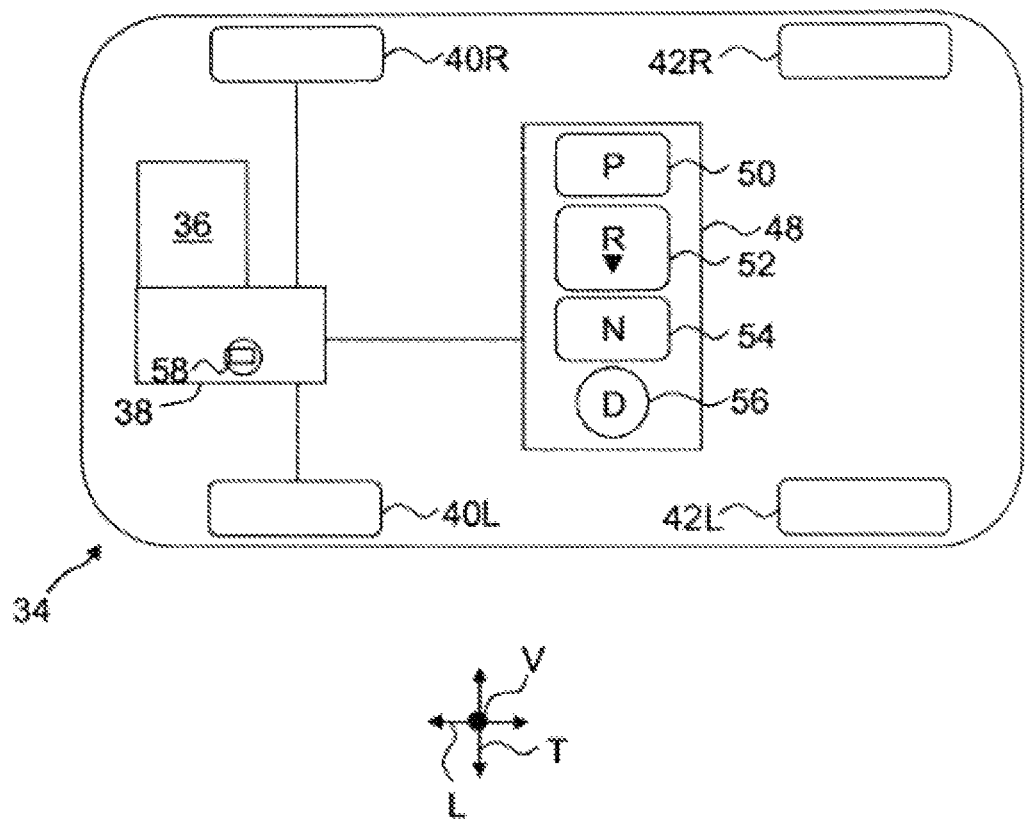
FIG. 1 is a schematic of a vehicle including an exemplary transmission system for use with or including a gear shifting and holding apparatus in accordance with the disclosed subject matter.

FIG. 1 is a schematic of a vehicle including an exemplary transmission system for use with or including a gear shifting and holding apparatus in accordance with the disclosed subject matter. This exemplary transmission system can be configured for use in a vehicle, such as but not limited to, a passenger car, truck, all-terrain vehicle (ATV), semi-tractor, off-highway vehicle, etc.

As shown in FIG. 1, a vehicle 34 can include a power source 36, transmission 38, pair of front wheels 40L, 40R, pair of rear wheels 42L, 42R, and gear selector 48. The power source 36 can be configured to output torque to the transmission 38. The transmission 38 can include a plurality of gears that can be selectively engaged and disengaged in various combinations to provide a plurality of drive ratios for transmitting torque output by the power source 36 to at least one of the wheels 40L, 40R, 42L, 42R.

Some of the embodiments are disclosed below in the context of a vehicle with a drive-by-wire transmission 38. However, other embodiments are intended to include or otherwise cover any type of transmission other than the disclosed drive-by-wire system.

Figure 2:
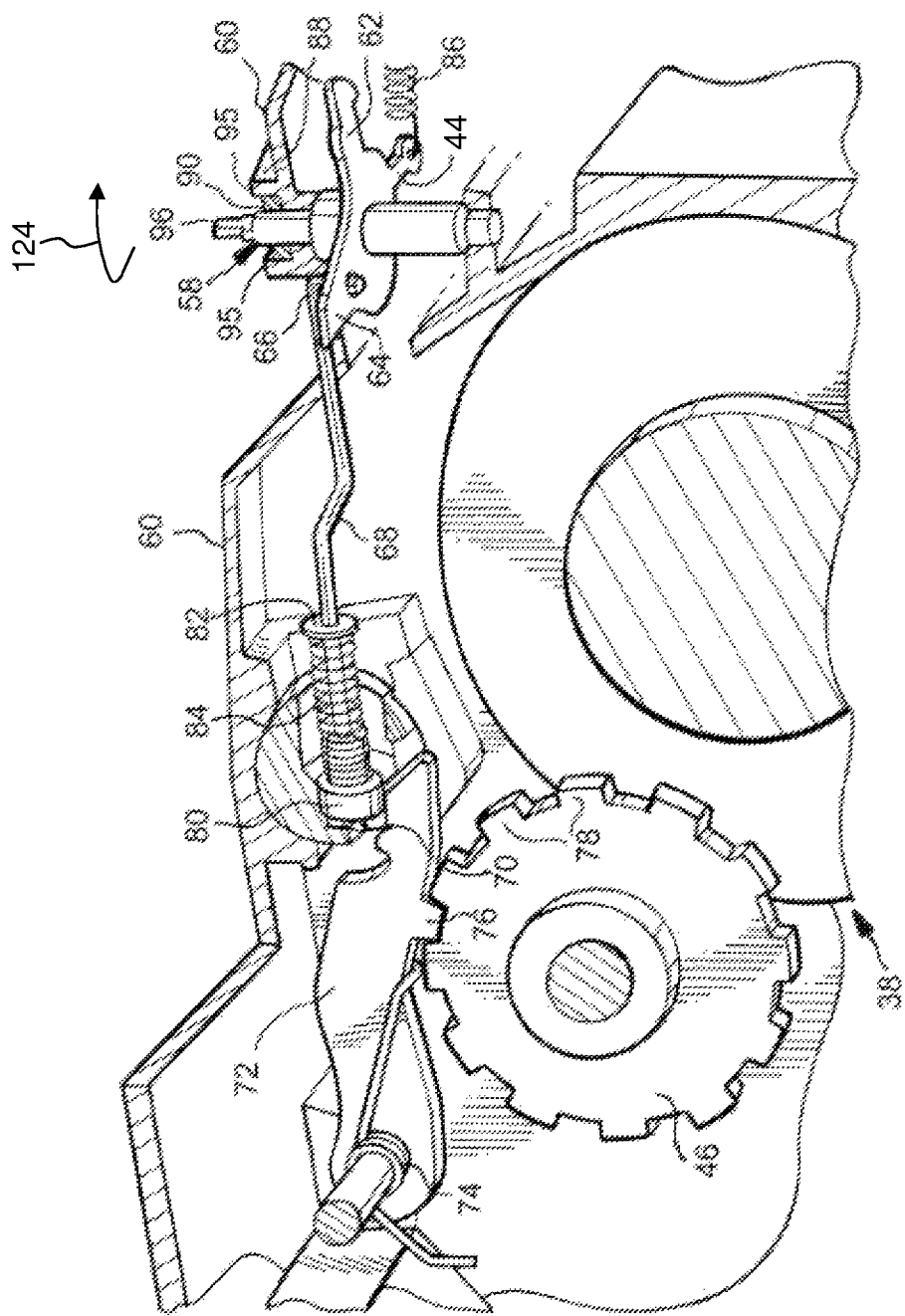
FIG. 2 is a perspective view, partially in cross-section, of a portion of an exemplary transmission, and in particular an exemplary park release mechanism of the transmission that is in an park engaged state.

FIG. 2 is a perspective view, partially in cross-section, of a portion of an exemplary transmission, and in particular an exemplary park release mechanism of the transmission that is in an park engaged state. As shown in FIG. 2, the transmission 38 can include a parking gear 46 that can lock rotation of a transmission output shaft so that the driven wheel(s) 40L, 40R, 42L, 42R is/are locked from rotation if the parking gear 46 is in an engaged state.

Figure 3:
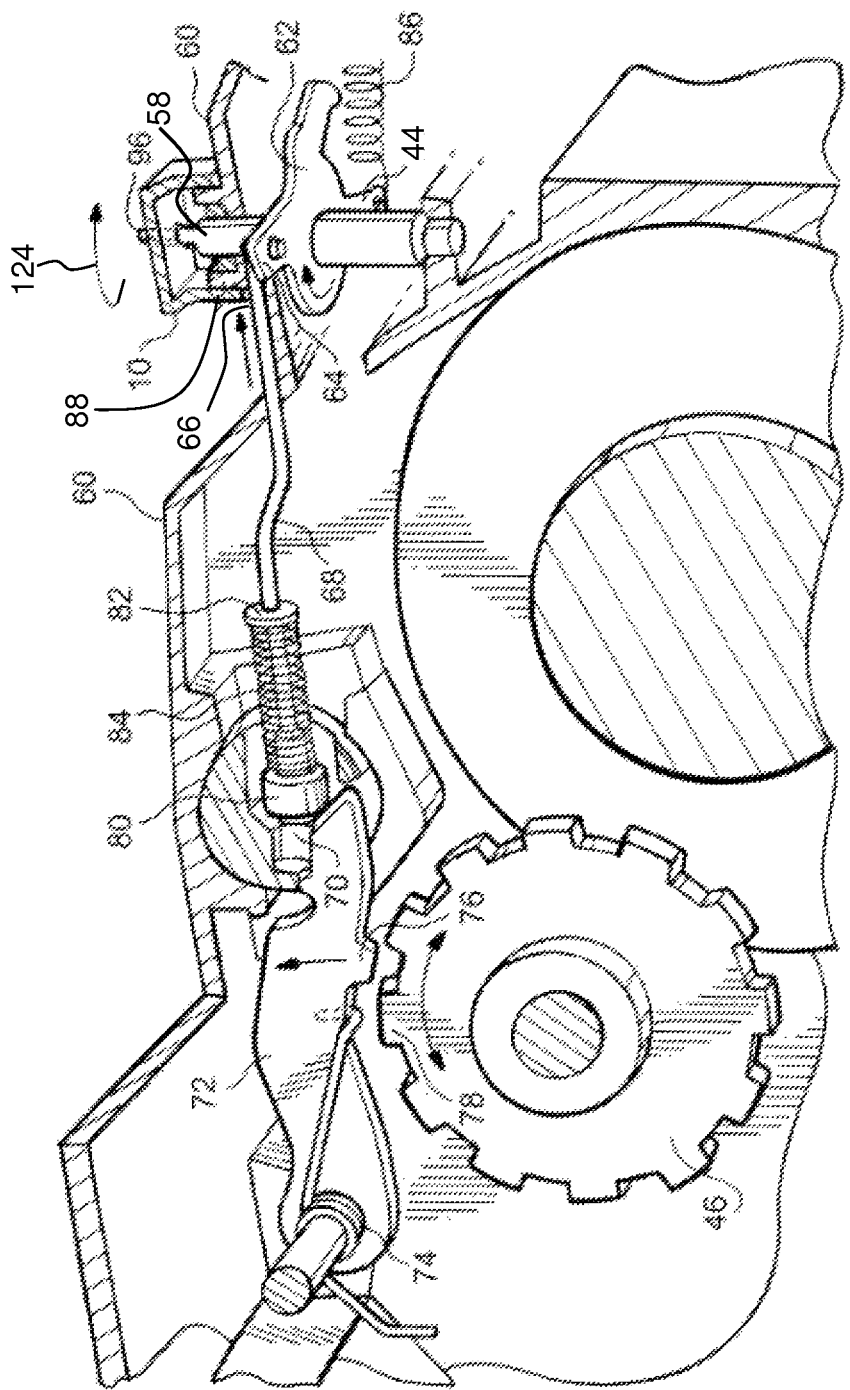
FIG. 3 is a perspective view, partially in cross-section, of a portion of an exemplary transmission, and in particular an exemplary park release mechanism of the transmission that is in a neutral state.

FIG. 3 is a perspective view, partially in cross-section, of a portion of an exemplary transmission, and in particular an exemplary park release mechanism of the transmission that is in a neutral state. As shown in FIG. 3, the transmission 38 can be configured into a neutral state in which the parking gear 46, and the plurality of other gears, can be disengaged from the output shaft of the transmission 38, thereby enabling each driven wheel 40L, 40R, 42L, 42R to be freely rotatable.

As shown in FIG. 1, the manually actuable gear selector 48 can be provided to enable a vehicle operator to change a transmission gear selection condition. Embodiments are intended to include or otherwise cover any type of gear selector to enable performance of this manual operation, including known, related art or later developed technologies. In some embodiments, the gear selector 48 can be in communication, such as in electrical communication, with the transmission 38 to permit the vehicle operator to instruct the transmission 38 to engage any of the plurality of gear ratios, parking gear 46, neutral state, etc., of the transmission 38. In some embodiments, the electrical communication can operate in accordance with a drive-by-wire system.

The gear selector 48 can include an actuation mechanism to enable manual selection of the appropriate gear ratio, parking gear 46, neutral state, etc. In the embodiment shown in FIG. 1, a plurality of actuation mechanisms, such as switches 50, 52, 54, 56, are provided to enable this manual selection, wherein a separate switch is provided for each gear. For example, actuation of: 1) the park switch 50 can instruct the transmission 38 to engage the parking gear 46; 2) the reverse switch 52 can instruct the transmission 38 to engage the reverse drive ratio; 3) the neutral switch 54 can instruct the transmission 38 to be in the neutral state; and 4) the drive switch 56 can instruct the transmission 38 to engage one the forward drive ratios.

However, embodiments are intended to include or otherwise cover other actuation mechanisms. For example, as an alternative to multiple switches, a single switch with multiple settings can be manually actuated to instruct the transmission to adopt the appropriate gear ratio, parking gear 46, neutral state, etc.

Some of the above actuation mechanisms, such as those where the gear selector 48 is in electrical communication with the transmission 38, can be dependent on the supply of electricity. This dependency on electricity thereby can impede the shifting of gear selection conditions, such as into Neutral to enable manual movement, service, etc., without a source of electricity, such as in the case of a dead or inoperable battery, etc. For example, if the vehicle's electrical system is inoperative and the parking gear 46 is engaged, the vehicle 34 cannot be easily moved to a location suitable for diagnosing the inoperative electrical system, if necessary, and repairing or replacing one or more components of the electrical system.

It may therefore be beneficial to provide methods and apparatus for enabling the shifting of gear selection conditions under any one or multiple of the above circumstances. This shifting of gear selection conditions can include or otherwise cover the ability to shift among or to all gear selection conditions; only among or to certain gear selection conditions; and/or among or to only a single gear selection condition, such as the Neutral selection condition. Some of the disclosed methods and apparatus enable both shifting among or to gear selection conditions, as well as holding, locking or maintaining the transmission in the selected gear for a certain period.

The transmission 38 of some embodiments therefore includes a release mechanism for performing any of the above operations. As shown in FIGS. 1-3, the release mechanism can include a release shaft 58 that extends within, and protrudes beyond, an exterior of a transmission case 60. In the embodiments disclosed below, the release shaft 58 is coupled to an engagement mechanism of the parking gear 46 to enable either engagement or disengagement of the parking gear 46. However, the release shaft 58 can be directly or indirectly coupled to an engagement mechanism of any of the gears in addition, or as an alternative, to the parking gear 46. As discussed in more detail below, a bracket 10 or other tool can be configured to directly or indirectly engage and rotate the release shaft 58, and thereby actuate engagement or disengagement of the parking gear 46, by virtue of the fact that release shaft 58 is coupled to the engagement mechanism of the parking gear 46.

II. Release Mechanism

FIGS. 2 and 3 show the release shaft 58 inside transmission case 60. In some embodiments, a plate member 62 can be fixably secured to the release shaft 58 inside transmission case 60, such that rotation of release shaft 58 can cause rotation of plate member 62. Plate member 62 can be arranged such that a vertical axis of release shaft 58, which is defined by a longitudinal or axial extent of release shaft 58, is orthogonally oriented relative to a plane in which the plate member 62 is oriented. Plate member 62 can include an arm portion 64 to which a proximal end 66 of release rod 68 can be connected.

A distal end 70 of release rod 68 can normally urge and/or maintain a pawl 72 in an engaged position against the biasing of a pawl spring 74, wherein a tooth 76 of pawl 72 meshes with gear teeth 78 of the parking gear 46. This position can correspond to transmission 38 being in a park engaged state, and/or correspond to a power source 36 of a vehicle 34 being turned off, thereby preventing vehicle movement.

In some embodiments, distal end 70 of release rod 68 can include an engaging member 80 that can be slidably disposed on release rod 68 for engaging parking pawl 72, which as discussed above can cause tooth 76 to engage or otherwise mesh with the parking gear teeth 78. Engaging member 80 can be urged away from the proximal end 66 of release rod 68 by a coil spring 84, which is disposed between engaging member 80 and a washer element 82. The washer element 82 is disposed at or on release rod 68, between the proximal and distal ends 66, 70, respectively. The sliding arrangement of engaging member 80 at or on release rod 68 can allow for smoother cooperation between the release rod 68 and pawl 72, particularly in situations where tooth 76 of parking pawl 72 is not precisely aligned between two adjacent gear teeth 78 of the parking gear 46.

If release shaft 58 is rotated in a first rotatable direction 124 (counter-clockwise direction in FIGS. 2 and 3), then plate member 62 can rotate in that direction and cause release rod 68 to move away from pawl 72. This movement can disengage parking gear 46 by causing engaging member 80 to move away from pawl 72, thereby allowing pawl spring 74 to rotate pawl 72 out of meshing engagement with parking gear 46. Parking gear 46 is then free to rotate, and the transmission 38 can be placed in a neutral state.

A spring 86 can be connected to a flange 44 of plate member 62 for biasing the plate member 62, and thereby the release shaft 58 and release rod 68, in a second rotatable direction, i.e., a rotatable direction opposite the first rotatable direction (clockwise direction in FIGS. 2 and 3). The release shaft 58 is thereby biased to the first (engaged) position and away from the second (neutral) position by the spring 86. The release rod 68 is also biased into engagement with pawl 72, which engages parking gear 46 by causing engaging member 80 to move into contact with pawl 72, thereby overcoming the force of pawl spring 74 to rotate pawl 72 into meshing engagement with parking gear 46. Parking gear 46 is then not free to rotate, and the transmission 38 is placed in a parked state.

As will be discussed in further detail below, the bracket 10 can be configured to maintain the release shaft 58 in the second position against the biasing force of the spring 86, if the tool 10 is used to rotate the park release shaft 58 in the first rotatable direction 124.

III. Bracket 10

A. Interaction Between Bracket 10 and Protuberance 88

Figure 4:
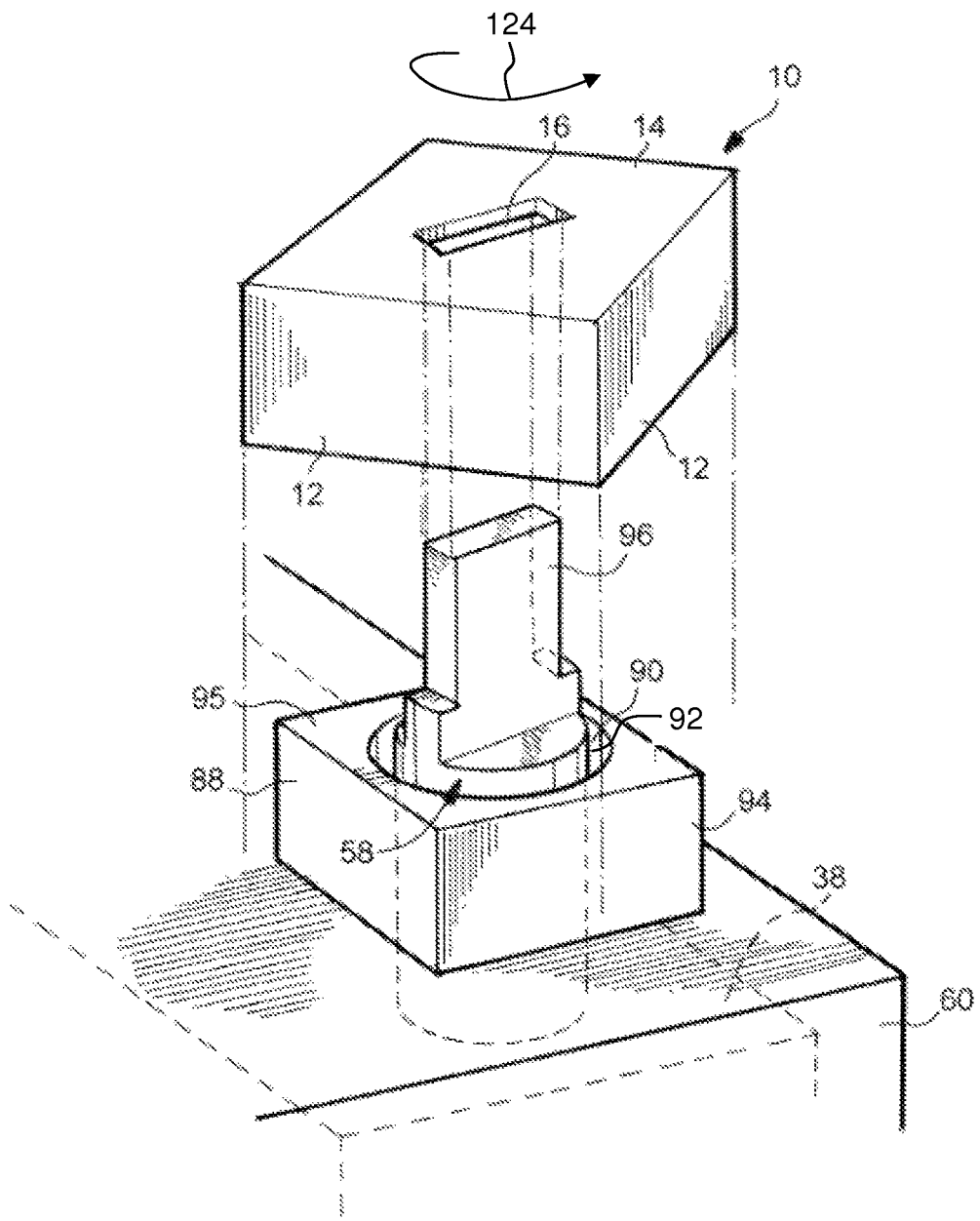
FIG. 4 is a partial perspective view of an exemplary bracket, protuberance, and portions of the transmission of FIGS. 2 and 3, with the bracket spaced from the protuberance.

FIG. 4 is a partial perspective view of an exemplary bracket 10, protuberance 88, and portions of the transmission of FIGS. 2 and 3, with the bracket 10 spaced from the protuberance 88. As will be described more fully below, the bracket 10 is configured to rotate release shaft 58, which rotates release rod 68 and selectively causes disengagement and engagement of the parking gear 46.

Exemplary bracket 10 can be oriented to receive and engage keyed portion 96, which constitutes a portion of the release shaft 58 that is disposed exterior to the transmission case 60. As discussed above, release shaft 58 can be operably coupled to various elements of the transmission 38, such that rotation of the park release shaft 58 transitions or actuates the transmission 38 from a parked state to a neutral state.

As shown in FIG. 4, the transmission case 60 can include a shaft aperture 90 that is formed as a cylindrical opening through protuberance 88 at or on the exterior of transmission case 60. Release shaft 58 can be located adjacent to, or extend through, aperture 90, such that release shaft 58 is accessible outside of the transmission case 60.

The bracket 10 and protuberance 88 can be formed in any shape that enables the operations disclosed herein to be performed. In the embodiment shown in FIG. 4, protuberance 88 is in the form of a polygonal-shaped block member that is positioned on or at, and extends outwardly from, transmission case 60. Aperture 90 can formed in in the protuberance 88 in any shape that enables the guiding of release shaft 58 therethrough, such that an open end 92 of aperture 90 is defined in a protuberance top surface 95.

As discussed above in the context of FIGS. 2 and 3, release shaft 58 can be operatively connected to various elements of the transmission 38, such that rotating release shaft 58 rotates release rod 68 and thereby places transmission 38 into the neutral state. In one embodiment, release shaft 58 can be manually rotated in the first direction 124 (counter-clockwise direction in FIGS. 2 and 3), which moves release rod 68 out of engagement with pawl 72, which allows pawl spring 74 to disengage pawl tooth 76 from parking gear teeth 78.

Bracket 10 can be configured to be positioned over a guide defined by protuberance 88, and engage keyed portion 96 of release shaft 58 that is exterior to the transmission case 60. In the embodiment shown in FIG. 4, protuberance 88 includes four side walls 94. The lengths of the protuberance side walls 94 is less than lengths of corresponding side walls 12 of bracket 10, such that protuberance 88 can be removably received by, and positioned within, bracket 10. In other words, when properly aligned and fully engaged, bracket 10 is seated over and surrounds protuberance 88.

A height of protuberance side walls 94 may be equal to or greater than a height of side walls 12 of bracket 10, such that a top end section 14 of bracket 10 abuts a top surface of protuberance 88. Keyed portion 96 can extend to a height (away from protuberance 88) that is a greater than a height of perpendicular side walls 12 of bracket tool 10, such that the keyed portion 96 extends within elongated slot 16.

Figure 5:
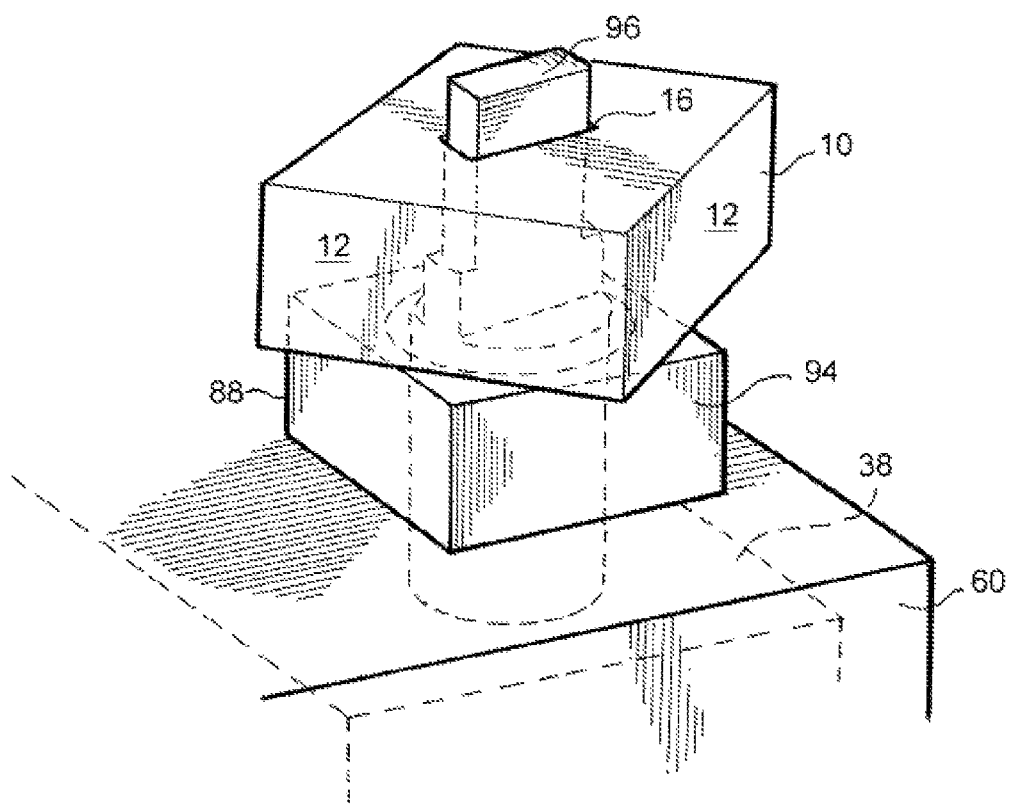
FIG. 5 is a partial perspective view of an exemplary bracket, protuberance, and portions of the transmission of FIGS. 2 and 3, with the bracket disposed on top of the protuberance, such that the release shaft is in the first (park engaged) position.

FIG. 5 is a partial perspective view of an exemplary bracket 10, protuberance 88, and portions of the transmission of FIGS. 2 and 3, with the bracket 10 disposed on top of the protuberance 88, such that the release shaft 58 is in the first (park engaged) position.

As discussed above with regard to FIG. 4 and shown in FIG. 5, release shaft 58 can be disposed such that an upper end of the shaft 58 is spaced apart from an upper end of the transmission case 60, and can have a keyed configuration that for cooperative engagement with bracket 10. For example, the keyed portion 96 of the release shaft 58 can be oriented for partial or full receipt within elongated slot 16 of top end section 14 of bracket 10. In other words, keyed portion 96 of release shaft 58 can cooperatively fit within elongated slot 16 defined in the top end section 14 of bracket 10.

In the embodiment shown in FIGS. 4 and 5, elongated slot 16 is shown in a centrally-oriented position within top end section 14 of bracket tool 10. Likewise, keyed portion 96 is shown as a centrally-oriented member fixed to or extending from release shaft 58. However, embodiments are intended to include or otherwise cover other orientations and arrangements that can be employed for cooperative engagement between mechanisms. For example, some alternative embodiments include keyed portion 96 and elongated slot 16 that are eccentrically located. In fact, embodiments are intended to include or otherwise cover any structures and dispositions of these elements that enables the bracket 10 to engage the release shaft, such that rotation of the bracket 10 causes the release shaft 58 to rotate.

In some embodiments, release shaft 58 can be configured to rotate between a first, or park engaged, position and second, or neutral, position. When transmission 38 is in a state where parking gear 46 is engaged, park release shaft 58 is disposed in the first (park engaged) position. In fact, FIG. 5 shows bracket tool 10 and release shaft 58 disposed in the first (park engaged) position.

Release shaft 58 is in the first (park engaged) position corresponding to a park engaged state of the transmission 38 in its default position, i.e., prior to the bracket 10 engaging and rotating the release shaft 58. As shown in FIG. 5, bracket 10 can be manually oriented such that elongated slot 16 is aligned above the keyed portion 96, with the keyed portion 96 and park release shaft 58 in the first position. Bracket 10 can be lowered to a position where keyed portion 96 is at least partially received through elongated slot 16, with bracket 10 remaining elevated above protuberance top surface 95.

As shown in FIG. 5, elongated slot 16 extends in a direction of elongation that intersects planes of the side walls 12, which causes the bracket 10 to be oriented at an offset angle relative to the protuberance 88 when the release shaft 58 is in the first (park engaged) position. Thus, the bracket interior space 18 is misaligned with the protuberance side walls 94, causing the bracket 10 to rest above the protuberance 88. However, as disclosed below, rotation of the bracket 10 can cause the bracket 10 and protuberance 88 to be aligned, such that the protuberance 88 fits inside of the bracket 10, i.e., protuberance side walls 94 and top surface 95 are disposed in the bracket interior space 18.

Figure 6:
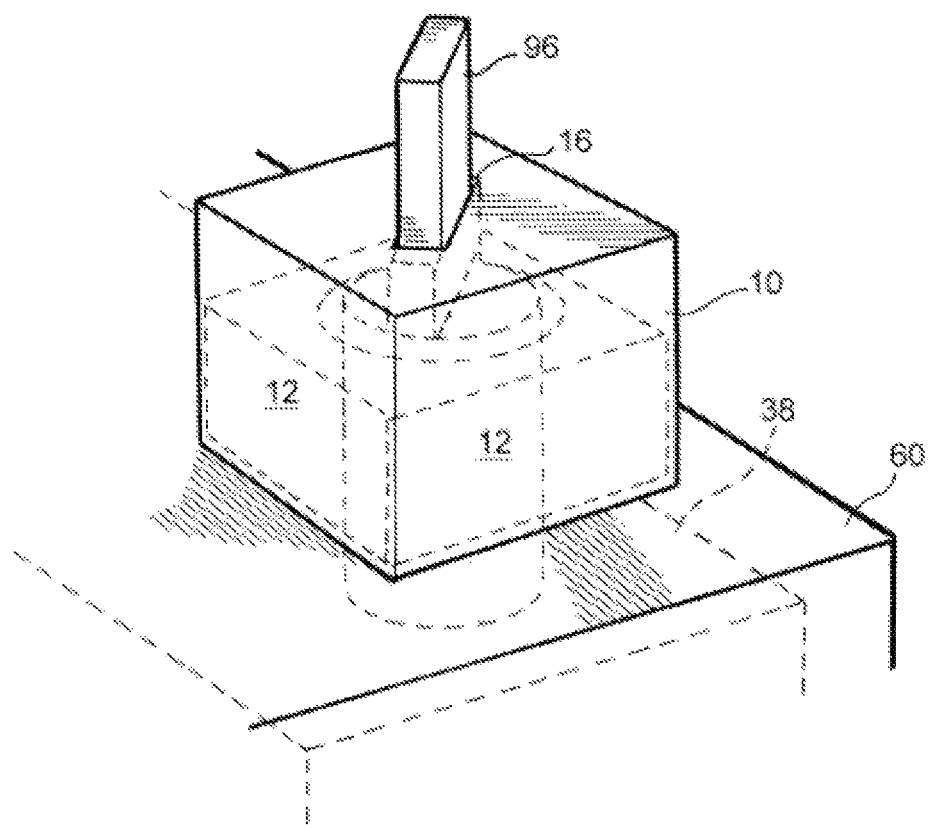
FIG. 6 is a partial perspective view of an exemplary bracket, protuberance, and portions of the transmission of FIGS. 2 and 3, with the protuberance disposed within the bracket, such that the release shaft is in the second (neutral) position.

FIG. 6 is a partial perspective view of an exemplary bracket, protuberance, and portions of the transmission of FIGS. 2 and 3, with the protuberance disposed within the bracket, such that the release shaft 58 is in the second (neutral) position. If bracket tool 10 is lowered and orientated such that keyed portion 96 is at least partially received through elongated slot 16, then tool 10 can be rotated in a counter-clockwise direction.

Rotating bracket 10 in the counter-clockwise direction allows the side walls 12 of the bracket 10 to be aligned with the side walls 94 of the protuberance 88, thereby enabling the bracket 10 to be lowered such that protuberance 88 fits within the bracket 10. The bracket 10 is then held in place over the protuberance 88, against the bias of the spring 86, based on the contact between the side walls and edges of both of these elements. Maintaining the bracket 10 in this orientation also fixes the release shaft 58 in this orientation.

Figure 7:
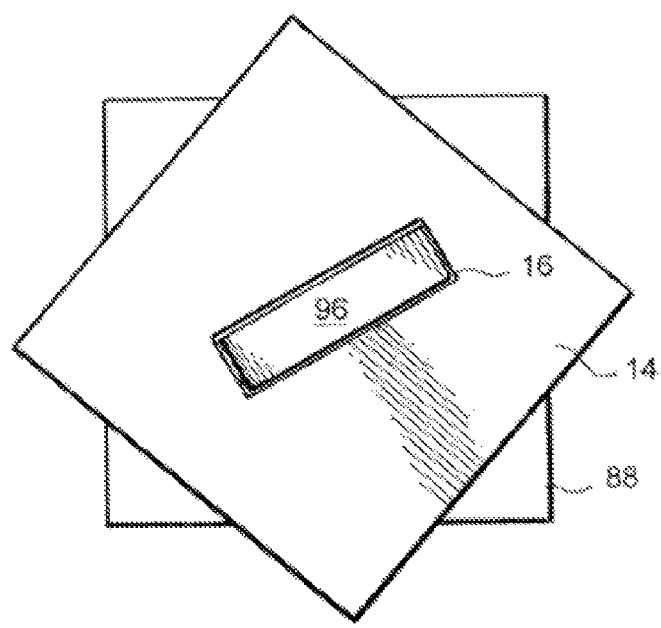
FIG. 7 is a top plan view showing the bracket disposed over the protuberance, prior to any rotation, such that the release shaft is in the first (park engaged) position.
Figure 8:
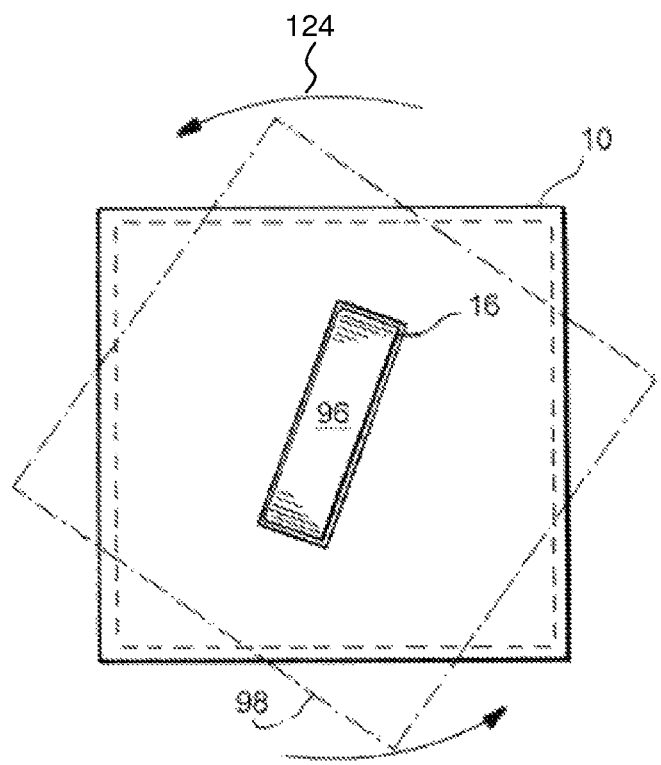
FIG. 8 is a top plan view showing two positions of the bracket, including the bracket on top of the protuberance (first (park engaged) position), and the bracket rotated such that the protuberance fits inside of the bracket (second (neutral) position.

FIG. 7 is a top plan view showing the bracket 10 disposed over the protuberance, prior to any rotation, such that the release shaft 58 is in the first (park engaged) position. Rotation of tool 10 in the counter-clockwise direction then causes the keyed portion 96 and release shaft 58 to similarly rotate, from the first (park engaged) position to the second (neutral) position, which places transmission 38 in a neutral state. FIG. 8 is a top plan view showing two positions of the bracket 10, including the bracket 10 on top of the protuberance 88 (first (park engaged) position), and the bracket 10 rotated such that the protuberance fits inside of the bracket 10 (second (neutral) position.

Rotation of the release shaft 58 causes the plate member 62 to rotate, which moves the release rod 68 away from and out of engagement with the pawl 72. This disengagement with the pawl 72 causes the pawl spring 74 to move pawl 72 away from the parking gear 46, such that pawl tooth 76 is moved out of engagement with the gear teeth 78 of the parking gear 46, thereby placing the transmission on the neutral state. Thus, bracket 10 can be used to place and maintain the transmission 38 in the neutral state independently of the vehicle's electrical system.

In other words, keyed portion 96 and thus release shaft 58 can rotate within a predetermined angle of rotation that can be sufficient to cause the tooth 76 of the parking pawl 72 to disengage from the gear teeth 78 of the parking gear 46 in order to place transmission 38 in a neutral state. In the embodiments shown in the figures discussed above, release shaft 58 can rotate in a counter-clockwise direction, such as for approximately twenty degrees, away from an engaged position to a neutral position. However, the various embodiments are not limited to any specific direction of rotation and angle of rotation, and in fact embodiments are intended to cover various directions of rotations, angles, and distances of rotations. For example, in some embodiments, release shaft 58 can rotate in a clockwise direction away from the engaged position to the neutral position.

B. Bracket Structure

Figure 9:
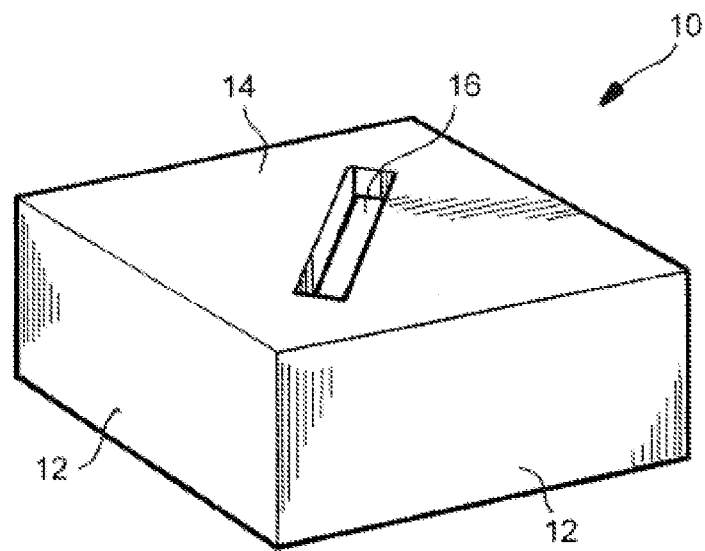
FIG. 9 is a perspective view of an exemplary bracket in accordance with the disclosed subject matter.

FIG. 9 is a perspective view of an exemplary bracket 10 in accordance with the disclosed subject matter. As discussed above, bracket 10 can be formed in a polygonal-shaped geometry that includes a plurality of side walls 12 and a top end section 14. In the embodiment shown in FIG. 9, each of four side walls 12 of bracket 10 define a rectangular exterior surface, and the top end section 14 defines a square exterior surface.

However, embodiments are not limited to these shapes and geometries. For example, various aspects of the bracket 10, including the side walls 12 and top end section 14, can each be formed of any size and shape that is able to perform the above operations. Thus, these features of the bracket 10 can be formed of any size and shape (including triangular, polygonal, irregular, etc.) that enables the appropriate communications with the protuberance 88 and keyed portion 96 of the release shaft 58. In fact, the bracket 10 does not even need to include four side walls 12, and instead can include three side walls that define a triangular configuration, assuming that this triangular configuration would then communicate with the configuration of the protuberance 88.

As another example, the exterior of the top end section 14 of bracket 10 is shown in the figures as being substantially planar and/or flat. However, this exterior surface can be provided in any shape or contour, such as convex and concave shapes. In fact, some of these embodiments tailor the exterior surface shape to enhance functionality, such as by enhancing grip ability of the bracket 10 to facilitate a user manually grasping and rotating the bracket 10.

The elongated slot 16 defined in the top end section 14 of the bracket 10 can also be formed into any size, shape and orientation that enables performance of the relevant operation(s) discussed above, i.e., communication with the keyed portion 96 of the release shaft 58. For example, elongated slot 16 can be oriented differently than shown in the figures, and/or can be provided in different size and shapes that enable the keyed portion 96 to be secured to the bracket 10, such that rotation of the bracket 10 causes the keyed portion (and thus the release shaft 58) to rotate.

Figure 10:
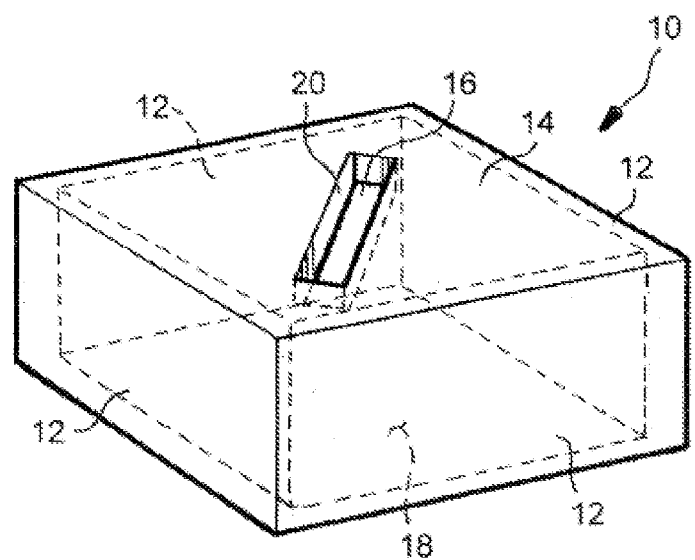
FIG. 10 is a perspective view that shows internal structures of the exemplary bracket of FIG. 9 in accordance with the disclosed subject matter.

FIG. 10 is a perspective view that shows internal structures of the exemplary bracket 10 of FIG. 9 in accordance with the disclosed subject matter. As shown in FIG. 10, the bracket is a hollow cap or cover that includes four side walls 12 and top end section 14 that define an interior space 18, which is accessible for a bottom of the bracket 10. Interior space 18 can be defined volumetrically by the dimensions of walls 12 and top end section 14. Elongated slot 16 can be defined by rectangular walls 20 formed in top end section 14 that provide an opening to interior space 18 through which an object or element can pass.

As discussed above with regard to FIG. 9, the various features of the bracket 10 can be formed of other shapes and sizes that perform the above operations. For example, the side walls 12 and top end section 14 can be formed of any thickness to define an interior space 18 of any size and shape that communicates with the protuberance 88 and keyed portion 96.

Figure 11:
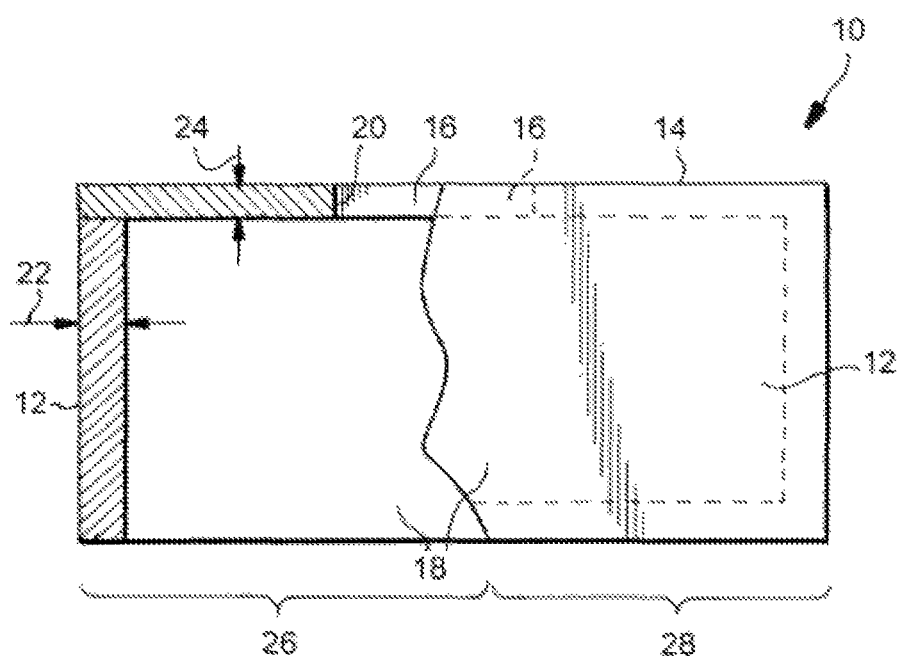
FIG. 11 is a side view, partially in cross-section, of the exemplary bracket of FIGS. 9 and 10.

FIG. 11 is a side view, partially in cross-section, of the exemplary bracket 10 of FIGS. 9 and 10. The side walls 12 and top end section 14 of bracket 10 are shown in FIG. 11 as each defining a constant thickness 22 and 24. However, other embodiments can include other configurations, such as any of the side walls 12 and top end section 14 having a thickness that varies. Side walls 12 and top end section 14 can form interior space 18 that is exposed in cross-sectional view 26, or shielded from view in side view 28.

All of the above elements can be formed of any material that enables performance of the above operations. For example, the bracket 10 can be made of any known, related art or later developed material, including metal or metal alloy, such as steel, aluminum, etc., thermoplastic material, and/or resin having sufficient strength and resiliency to perform the disclosed operations.

Figure 12:
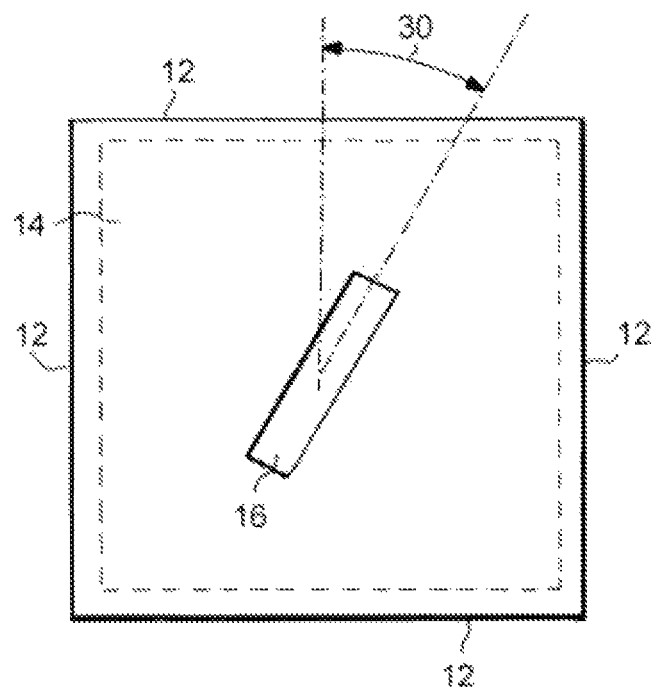
FIG. 12 is a top plan view of the exemplary bracket of FIGS. 9-11.

FIG. 12 is a top plan view of the bracket 10 of FIGS. 9-11, and FIG. 13 is a bottom plan view of this bracket 10. The slot is shown in these figures as extending through the top end section 14, from an exterior upper surface to an underside surface 32.

Figure 13:
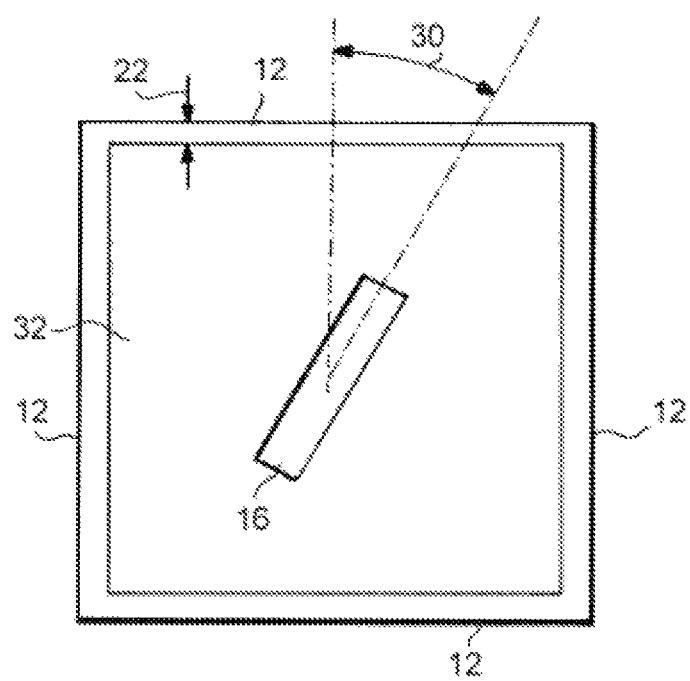
FIG. 13 is a bottom plan view of the exemplary bracket of FIGS. 9-11.

As shown in FIGS. 12 and 13, the elongated slot 16 extends in a direction of elongation that intersects planes defined by two of the side walls 12 at an angle 30. In the embodiment shown in the figures, the elongated slot 16 is oriented such that this angle 30 is acute and equal to between approximately 20 degrees to approximately 30 degrees.

This angle 30 is based on the amount of rotation required for: 1) the bracket 10 to fit over and cover protuberance 88 such that protuberance 88 is disposed in the interior space 18 of bracket 10, and 2) sufficient rotation of the keyed portion 96 and release shaft 58 to enable movement of the plate member 62 and release rod 68 to cause disengagement between the tooth 76 of pawl 72 and gear teeth 78 of the parking gear 46. However, embodiments are intended to include various other slot offsets that enable performance of the above operations.

IV. Methods of Operation

Figure 14:
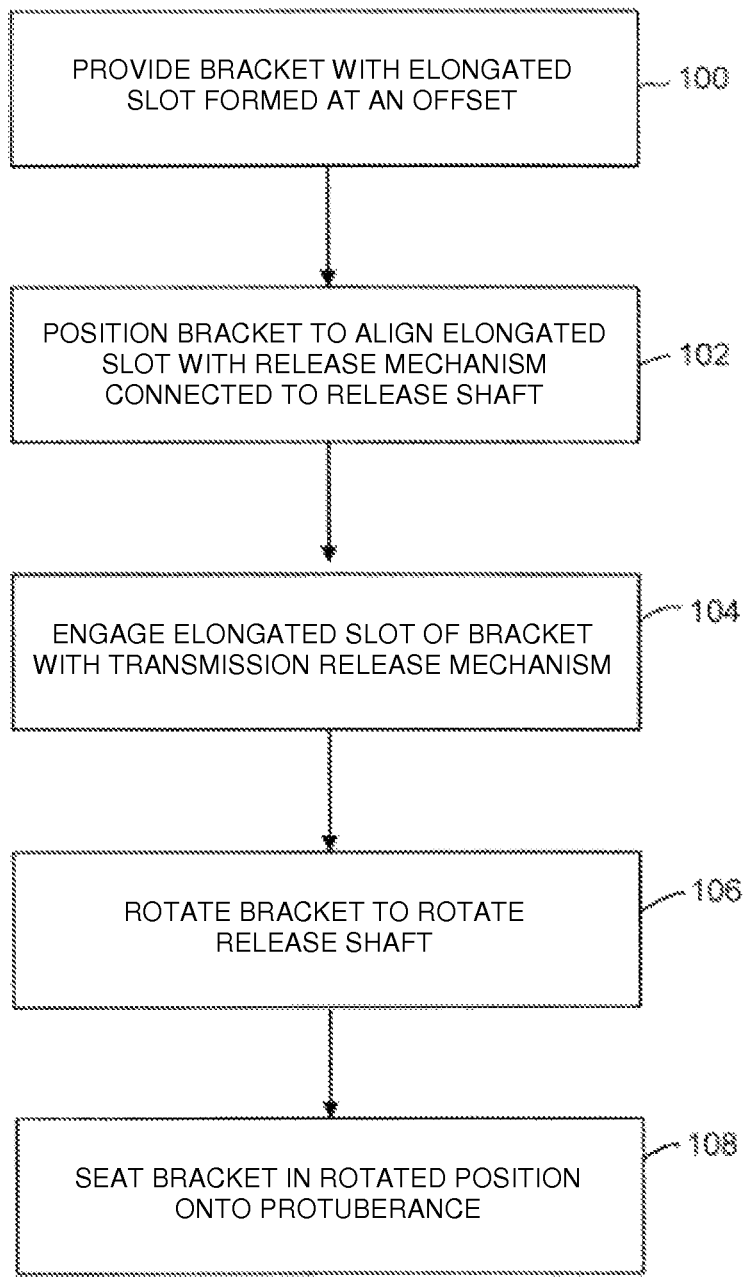
FIG. 14 is a flowchart of an exemplary method of shifting gears in accordance with the disclosure.

Embodiments are also intended to include or otherwise cover methods of manufacturing and/or using the features disclosed above, including the exemplary bracket 10. FIG. 14 is a flowchart of an exemplary method of shifting gears in accordance with the disclosure.

The method begins at Step 100 with providing the bracket 10 disclosed above, such as including the elongated slot 16 formed at an offset. Thus, the exemplary method is disclosed in association with the exemplary bracket 10 disclosed above, however embodiments are intended to include or otherwise cover methods of using other different types of brackets.

Step 102 includes positioning neutral bracket tool 10 over a release mechanism, i.e., positioning bracket tool 10 such that elongated slot 16 is disposed over keyed portion 96 of release shaft 58 for alignment and reception into elongated slot 16. The keyed portion 96 can then be received in and engaged by elongated slot 16 of bracket 10 at Step 104. Then, at Steps 106 and 108, bracket 10 is rotated to align the side walls 94 of protuberance 88 with the side walls 12 of bracket 10, so that lowering bracket 10 causes protuberance 88 to fit within the interior space 18 of bracket 10. This rotation also causes sufficient rotation of the keyed portion 96 and release shaft 58 to enable movement of the plate member 62 and release rod 68 to cause disengagement between the tooth 76 of pawl 72 and gear teeth 78 of the parking gear 46.

In other words, keyed portion 96 and release shaft 58 can rotate within a limited angle of movement in order to place transmission 38 in a neutral position. The angle and direction of movement can be any appropriate value and direction that can facilitate engagement and disengagement of the parking gear 46. In one embodiment, release shaft 58 can rotate in a counter-clockwise direction for approximately twenty degrees away from a park engaged position to a neutral position. However, specific directions and distances of movement of release shaft 58 are exemplary, and embodiments are intended to cover various directions of movements and distances of movement. In the first park engaged position, a manual or automatic torque force can be applied to bracket 10 that rotates bracket 10 in a horizontal plane above protuberance 88 without moving vertically. In such an orientation, side walls 12 of bracket 10 are unconstrained from encountering top surface 95 or side walls 94 of protuberance 88 when rotating.

After rotating release shaft 58, transmission 38 can be set to a neutral state. Thus, bracket 10 can be configured to seat over protuberance 88 to axially align elongated slot 16 with park release shaft 58 via interconnection with keyed portion 96. After securing bracket 10 onto protuberance 88, release shaft 58 can be held in place at a correct angle, and transmission 38 can be maintained in a neutral state until the tool 10 is removed from the protuberance 88.

However, if bracket tool is removed, the reverse torque on release shaft 58 can cause the tooth 76 of the pawl 72 to engage the parking gear 46, thus placing the transmission 38 in a park engaged state.

V. Basic Vehicle Components

The power source 36 for vehicle 34 can be an internal combustion engine, an electric motor or a hybrid of an internal combustion engine and an electric motor. The power source 36 configured as an internal combustion engine or a hybrid power source can have the engine output axis oriented in the longitudinal direction L or in the traverse direction T of the vehicle 34. The engine can be mounted forward of the front axles, rearward of the rear axles, or intermediate the front and rear axles. In an exemplary embodiment, the power source 36 is configured as a front transverse-mounted internal combustion engine.

The transmission 38 can be an automatic transmission or a semi-automatic transmission. Transmission 38 can include an input shaft, an output shaft, and a speed ratio assembly. A coupling can connect the engine output shaft to the transmission input shaft. The coupling can permit selective engagement/disengagement of the input shaft with the engine output shaft, or at least relative rotation of the engine output shaft with respect to the input shaft in any manner known in the art. Exemplary couplings can include, but are not limited to, a friction disc clutch and a torque converter. The control assembly can include a controller, a speed sensor, and a gear selector.

The speed ratio assembly can connect the input shaft to the transmission output shaft such that the transmission output shaft can rotate at variable speeds relative to the input shaft. The speed ratio assembly can be a stepped speed ratio assembly or a continuously variable speed ratio assembly, as is known in the art. The transmission input shaft can be referred to as a mainshaft.

Electrical communication lines within vehicle 34 can connect a controller to the power source 36, the transmission 38, the gear selector 48 and a sensor in any appropriate manner. Electrical communication can be either one-way communication or two-way communication and can be networked or not networked. The controller also can be referred to as an electronic control unit (ECU) or as a central processing unit. The sensor can be configured with hardware, with or without software, to perform the assigned task(s). The sensor can be configured as a smart sensor such that the sensor can process the raw data collected by the sensor prior to transmission to the ECU or the sensor can be configured as a simple sensor that passes the raw data directly to the ECU 26 without any manipulation of the raw data. The sensor can be configured to send data to the ECU, with or without a prompt from the ECU.

VI. Alternative Embodiments

While certain embodiments of the invention are described above, and FIGS. 1-14 disclose the best mode for practicing the various inventive aspects, it should be understood that the invention can be embodied and configured in many different ways without departing from the spirit and scope of the invention.

For example, embodiments are disclosed above in the context of bracket 10 shown in the figures. However, embodiments are intended to include or otherwise cover any type of bracket that performs the various operations disclosed above.

Figure 15:
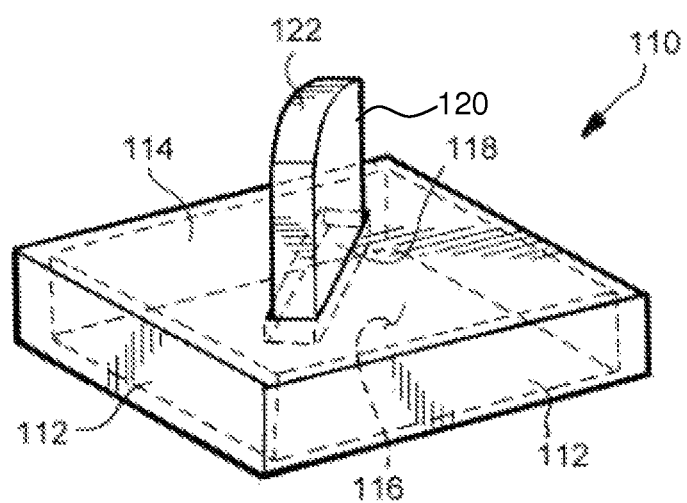
FIG. 15 is a perspective view of an alternative embodiment of a bracket in accordance with the disclosed subject matter.

FIG. 15 is a perspective view of an alternative embodiment of a bracket in accordance with the disclosed subject matter. The alternative bracket 110 can be formed as a walled structure that includes side walls 112 connected or joined at respective ends to form a square polygon that is capped by top end section 114. Side walls 112 can be constructed with a smaller height than side walls 12 of bracket 10. While side walls 112 are joined to top end section 114 to define a covered structure, bracket 110 does not include a corresponding connected bottom end section, thereby defining an interior space 116 that is accessed from a bottom end of bracket 110. Interior space 116 can be defined volumetrically by the dimensions of walls 112 and top end section 114. Top end section 114 can further include an exemplary aperture, or elongated slot, 118, which can be formed through top end section 114 at an offset angle similar to elongated slot 16.

However, elongated slot 118 can be completely covered with a hollow domed portion 120 that is only accessed from an underside of top end section 114. Domed portion 120 can be formed with a wall or walls extending around aperture 118 and away from top end section 114 up to dome top end 122. Domed portion 120 can be formed with sufficient dimensions and height to receive keyed portion 96 of release shaft 58.

While domed portion 120 is illustrated and described as an elongated extension, it will be apparent to one skilled in the art that various changes can be made, and equivalents employed, without departing from the scope of the invention. Exemplary embodiments are intended to include any type of structure to cover aperture 118. Keyed portion 96 can be received into domed portion 120 and rotated according to the system and methods of the embodiments. Once release shaft 58 is turned via keyed portion 96, bracket 110 can seat onto protuberance 88, thereby locking the transmission 38 in neutral.

Embodiments are intended to include or otherwise cover any type of gear selector 48, such as a gear shift lever, which can be movable into one of a plurality of positions, such that manual actuation of the gear shift lever can effect a shift from one gear ratio to another gear ratio, shift to the neutral state of the transmission, or engagement of the parking gear 46. The gear shift lever can be mounted in any one of a plurality of different locations within the vehicle, including but not limited to, on the center console, on the steering column, on the steering wheel, and on the instrument panel.

Embodiments are also intended to include or otherwise cover methods of using and methods of manufacturing the bracket and other elements disclosed above. The methods of manufacturing include or otherwise cover processors and computer programs implemented by processors used to design various of the disclosed elements and systems. For example, embodiments are intended to cover processors and computer programs used for design or testing.

Further, exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A transmission actuator for use with a vehicle transmission that includes at least one gear disposed within a transmission case, the transmission case including an exterior surface and an opening defined therein, the transmission actuator comprising:

a release shaft operatively coupled to the at least one gear, and movable between a first position in which the at least one gear is in an engaged state, and a second position in which the at least one gear is in a disengaged state, the release shaft extending through the opening of the transmission case so as to define an exterior portion that projects beyond the exterior surface of the transmission case;

a protuberance disposed at the exterior surface of the transmission case and having an exterior geometry, the release shaft extending through the protuberance; and a bracket including an interior space and an opening in communication with the interior space, the interior space having an interior geometry that is compatible with the exterior geometry of the protuberance, the opening of the bracket is operatively connectable to the exterior portion of the release shaft to enable manual actuation of the release shaft from the first position to the second position such that, entry of the protuberance into the interior space of the bracket is blocked due to misalignment of the interior geometry of the bracket with the exterior geometry of the protuberance if the exterior portion of the release shaft engages the opening of the bracket when the release shaft is in the first position, and the protuberance engages the bracket in the interior space due to alignment of the interior geometry of the bracket with the exterior geometry of the protuberance if the exterior portion of the release shaft engages the opening of the bracket when the release shaft is in the second position to thereby automatically hold the release shaft in the second position subsequent to manual actuation of the release shaft from the first position to the second position.

2. The transmission actuator of claim 1, wherein the at least one gear corresponds to a Park gear of the transmission, such that the disengaged state of the Park gear corresponds to a Neutral state of the transmission.

3. The transmission actuator of claim 1, further including:
a plate member attached to the release shaft such that rotation of the release shaft correspondingly rotates the plate member;
a release rod connected to the plate member such that rotation of the plate member results in linear movement of the release rod; and
a pawl actuable by the release rod into and out of engagement with the at least one gear;
wherein rotation of the release shaft and corresponding rotation of the plate member causes the release rod to move linearly and thereby actuate the pawl into and out of engagement with the at least one gear.

4. The transmission actuator of claim 3, further including a pawl spring that biases the pawl out of engagement with the at least one gear, linear movement of the release rod into contact with the pawl overcomes the bias of the pawl spring resulting in the pawl being actuated into engagement with the at least one gear, while linear movement of the release rod out of contact with the pawl results in the spring biasing the pawl out of engagement with the at least one gear.

5. The transmission actuator of claim 4, wherein counter-clockwise rotation of the release shaft over a predefined distance causes linear movement of the release rod away from and out of contact with the pawl, resulting in the spring biasing the pawl out of engagement with the at least one gear.

6. The transmission actuator of claim 5, further including a release spring connected to the plate member that biases the plate member and thereby the release shaft in the first position in which the at least one gear is in an engaged state, such that the release rod is out of contact with the pawl.

7. The transmission actuator of claim 1, wherein the exterior portion of the release shaft includes a keyed portion, and a channel extends through the protuberance, the channel being aligned with the opening of the transmission case such that keyed portion of the release shaft extends through the channel of the protuberance and projects beyond an exterior surface of the protuberance.

8. The transmission actuator of claim 7, wherein the bracket includes a top, the opening is in a form of a slot extending through the top, and the keyed portion that extends beyond the exterior surface of the protuberance is configured for disposition within the slot.

9. The transmission actuator of claim 8, wherein the bracket includes multiple side walls connected to the top so as to define the interior space, and the bracket can be manually manipulated into a first position wherein the keyed portion extends within the slot and the side walls of the bracket contact the exterior surface of the protuberance.

10. The transmission actuator of claim 9, wherein the bracket and protuberance can be configured such that the bracket is manually rotatable from the first position to a second position, wherein the keyed portion remains within the slot and the protuberance is disposed within the interior space of the bracket, thereby holding the release shaft in the second position in which the at least one gear is in the disengaged state.

11. A vehicular transmission system, comprising:
a transmission case that includes an exterior surface and an opening defined therein;
at least one gear disposed within the transmission case, the at least one gear corresponding to a Park gear of the transmission; and
a transmission actuator that includes:
a release shaft operatively coupled to the at least one gear, and movable between a first position in which the at least one gear is in an engaged state, and a second position in which the at least one gear is in a disengaged state that corresponds to a Neutral state of the transmission, the release shaft extending through the opening of the transmission case so as to define an exterior portion that projects beyond the exterior surface of the transmission case;
a protuberance disposed at the exterior surface of the transmission case and having an exterior geometry, the release shaft extending through the protuberance; and
a bracket including an interior space and an opening in communication with the interior space, the interior spaced having an interior geometry that is compatible with the exterior geometry of the protuberance, the opening of the bracket is operatively connectable to the exterior portion of the release shaft to enable manual actuation of the release shaft from the first position to the second position such that,
entry of the protuberance into the interior space of the bracket is blocked due to misalignment of the interior geometry of the bracket with the exterior geometry of the protuberance if the exterior portion of the release shaft engages the opening of the bracket when the release shaft is in the first position, and
the protuberance engages the bracket in the interior space due to alignment of the interior geometry of the bracket with the exterior geometry of the protuberance if the exterior portion of the release shaft engages the openin s of the bracket when the release shaft is in the second position to thereby automatically hold the release shaft in the second position subsequent to manual actuation of the release shaft from the first position to the second position.

12. The vehicular transmission system of claim 11, further including:
a plate member attached to the release shaft such that rotation of the release shaft correspondingly rotates the plate member;
a release rod connected to the plate member such that rotation of the plate member results in linear movement of the release rod; and
a pawl actuable by the release rod into and out of engagement with the at least one gear;
wherein rotation of the release shaft and corresponding rotation of the plate member causes the release rod to move linearly and thereby actuate the pawl into and out of engagement with the at least one gear.

13. The vehicular transmission system of claim 12, further including a pawl spring that biases the pawl out of engagement with the at least one gear, linear movement of the release rod into contact with the pawl overcomes the bias of the pawl spring resulting in the pawl being actuated into engagement with the at least one gear, while linear movement of the release rod out of contact with the pawl results in the spring biasing the pawl out of engagement with the at least one gear.

14. The vehicular transmission system of claim 13, wherein counter-clockwise rotation of the release shaft over a predefined distance causes linear movement of the release rod away from and out of contact with the pawl, resulting in the spring biasing the pawl out of engagement with the at least one gear.

15. The vehicular transmission system of claim 14, further including a release spring connected to the plate member that biases the plate member and thereby the release shaft in the first position in which the at least one gear is in an engaged state, such that the release rod is out of contact with the pawl.

16. The vehicular transmission system of claim 11, wherein the exterior portion of the release shaft includes a keyed portion, and a channel extends through the protuberance, the channel being aligned with the opening of the transmission case such that keyed portion of the release shaft extends through the channel of the protuberance and projects beyond an exterior surface of the protuberance.

17. The vehicular transmission system of claim 16, wherein the bracket includes a top, the opening is in a form of a slot extending through the top, and the keyed portion that extends beyond the exterior surface of the protuberance is configured for disposition within the slot.

18. The vehicular transmission system of claim 17, wherein the bracket includes multiple side walls connected to the top so as to define the interior space, and the bracket can be manually manipulated into a first position wherein the keyed portion extends within the slot and the side walls of the bracket contact the exterior surface of the protuberance.

19. The vehicular transmission system of claim 18, wherein the bracket and protuberance can be configured such that the bracket is manually rotatable from the first position to a second position, wherein the keyed portion remains within the slot and the protuberance is disposed within the interior space of the bracket, thereby holding the release shaft in the second position in which the at least one gear is in the disengaged state.

20. A method of disengaging at least one gear of a vehicular transmission, the at least one gear being disposed within a transmission case, the transmission case including an exterior surface and an opening defined therein, the method comprising:

manually positioning a bracket over a protuberance defined at the exterior surface of the transmission case, such that a keyed portion of a release shaft, which projects beyond the exterior surface of the transmission case, extends within an opening defined in a top surface of the bracket;

blocking entry of the protuberance into an interior space of the bracket by misaligning an interior geometry of the interior space with an exterior geometry of the protuberance if the release shaft engages the opening of the bracket when the release shaft is in a first position in which the at least one gear is in an engaged state;

rotating the bracket with the keyed portion disposed within the slot so as to correspondingly rotate the release shaft, the release being shaft operatively coupled to the at least one gear, such that rotation of the bracket actuates the release shaft from the first position, and a second position in which the at least one gear is in a disengaged state;

aligning the interior geometry of the bracket with the exterior geometry of the protuberance when bracket rotates the release shaft into the second position;

engaging the protuberance in the interior space of the bracket when the interior geometry of the bracket is aligned with the exterior geometry of the protuberance; and lowering the bracket over the protuberance such that the protuberance is disposed within an interior space of the bracket, the bracket and protuberance being configured to cooperate to automatically hold the release shaft in the second position subsequent to actuation of the release shaft from the first position to the second position.

\* \* \* \* \*